Sept. 18, 1951     A. J. FARRAR     2,568,582
PALLET CONSTRUCTION
Filed Jan. 9, 1947     2 Sheets-Sheet 1
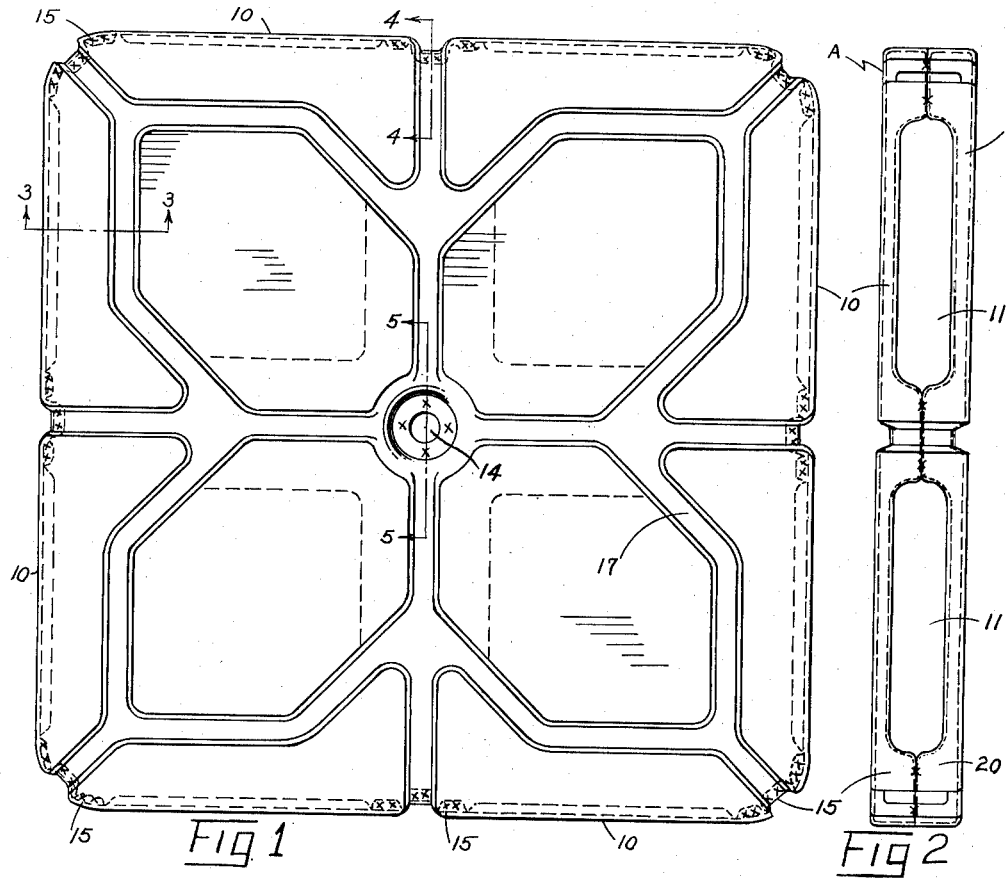
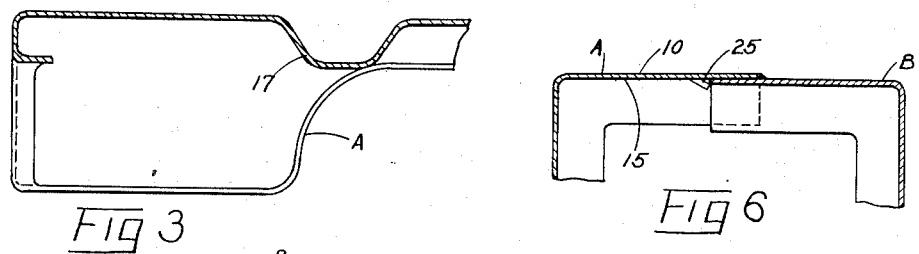
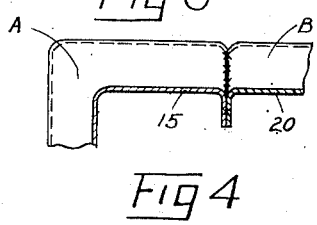
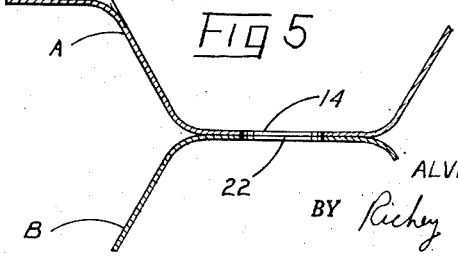
INVENTOR.
ALVIN J. FARRAR
BY Richey + Watts
ATTORNEYS Sept. 18, 1951 A. J. FARRAR 2,568,582
PALLET CONSTRUCTION
Filed Jan. 9, 1947 2 Sheets-Sheet 2
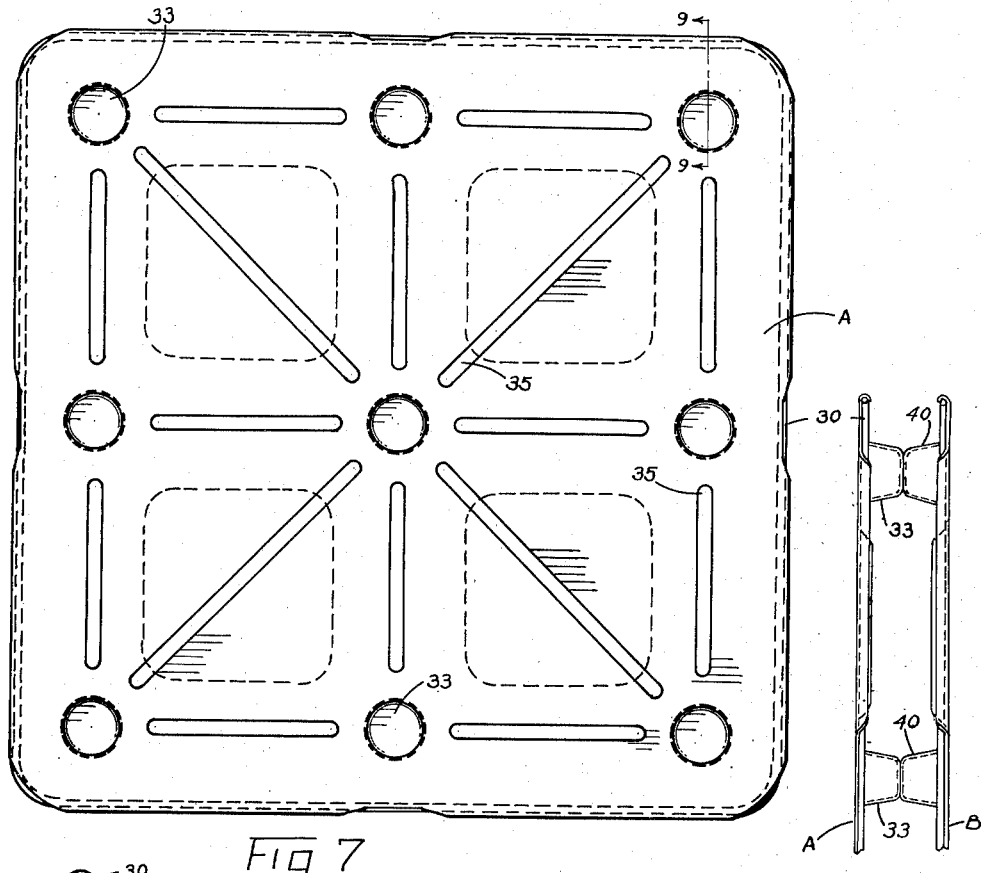
Fig 7
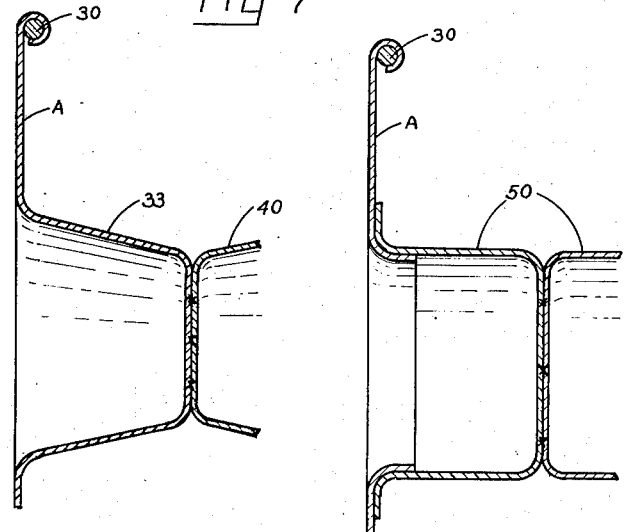
Fig 9   Fig 10
Fig 8
INVENTOR.
ALVIN J. FARRAR
BY Richy & Watts
ATTORNEYS Patented Sept. 18, 1951

2,568,582

UNITED STATES PATENT OFFICE 2,568,582

PALLET CONSTRUCTION

Alvin J. Farrar, Cleveland, Ohio, assignor to Republic Steel Corporation, Cleveland, Ohio, a corporation of New Jersey Application January 9, 1947, Serial No. 721,065

1 Claim. (Cl. 248—120)

The present invention relates generally to carrying means and is particularly concerned with novel pallets which are especially suited for carrying relatively small loads of metal structural and machine parts.

To facilitate handling of metal bodies in foundries and shops, a number and variety of loading platforms, pallets and portable trays have been developed over a long period. In the beginning these devices were moved principally by hand and their adaptability to use with various lifting means was not important. More recently, with the advent of motor driven trucks, carts and dollies having arms to engage pallets and lift and carry them from place to place, the old type of conventional design has imposed limitations upon the usefulness and efficiency of pallets and their carries. A demand has consequently developed for pallets which would be more versatile and more readily used with trucks, etc., than previously known pallets. To the best of my knowledge, however, this demand has not heretofore been answered.

The pallets of my present invention meet this demand and differ substantially from those of the prior art. Unlike prior art pallets, those of this invention are "four-way" rather than "two-way" or "one-way," that is my pallets are of construction permitting the entry of lift tongs, dollies, or the like from any one of the four sides of the pallets. Moreover, these pallets are of welded sheet metal construction comprising in each instance two substantially identical unitary parts. Their production therefore may be very rapid and economical. Pallets of a wide variety of sizes may be made in one installation by cutting sheet metal into sections of the size desired and proceeding with the usual stamping and welding operations, substituting a larger or smaller stamping die, as required. The strength of these pallets is no way inferior to any prior pallets and is superior to most. The pallets of this invention, furthermore, present no sharp or raw edges, which are the rule rather than the exception in conventional pallets because of their design and the methods of their manufacture.

Those skilled in the art will gain a further understanding of my present invention by referring to the drawings accompanying and forming a part of this specification, in which Figure 1 is a plan view of one form of pallet of this invention;

Figure 2 is a side view of the pallet of Fig. 1;

Figure 3 is a view taken on line 3—3 of Fig. 1;

Figure 4 is a view taken on line 4—4 of Fig. 1;

Figure 5 is a view taken on line 5—5 of Fig. 1;

Figure 6 illustrates a modification of the construction shown in Fig. 4;

Figure 7 is a plan view of another type of pallet of this invention;

Figure 8 is a fragmentary side elevational view of the pallet of Fig. 7;

Figure 9 is a view taken on line 9—9 of Fig. 7; and,

Figure 10 illustrates a modification of the construction shown in Fig. 9.

The generally square fabricated pallet illustrated in Fig. 1 consists of an upper deck A and a lower deck B, which together define four sides 10 each of which is provided with a pair of apertures 11 for receiving pallet carrying means.

Deck A is a substantially rectangular sheet metal element having a central aperture 14 and eight channel-like grooves 15, four of which are disposed at the corners and four of which are disposed substantially mid-way between the corners and along the edges of the sheet. These grooves are actually double flanges since they are disposed at right angles to the surface of the deck in their portions adjoining the deck and their end portions are disposed substantially parallel to the deck surface for engagement with similarly disposed end portions of grooves of the bottom plate or deck B. Deck A is further provided with a series of communicating channels 17 in its upper surface, which are formed by a stamping operation.

The bottom deck B has substantially the same dimensions and shape as deck A and is similarly provided with eight flanged grooves 20 disposed with edge portions substantially parallel to the surface of the plate. Deck B is likewise provided with a central aperture 22 for registry with aperture 14. Unlike deck A, deck B is cut away in four sections or quadrants around the central aperture. Thus in use with a conventional lift truck the forks of the truck may be inserted between decks A and B with wheels provided near the free ends of one pair of forks which may project downwardly through deck B and bear upon the floor, while the other pair of forks bears against the under surface of deck A and supports the pallet and its load.

A modification of the Fig. 4 construction is shown in Fig. 6, in which the end portions of the flanges are not disposed substantially parallel to the decks but extend substantially at right angles thereto and are fitted in engagement in a telescope joint made by overlapping end portions of opposed flanges. The end portions of the flanges 15 are provided with lugs 25 disposed to serve as abutments for the end surfaces of the telescoping flanges around the pallet.

The flanges, when the decks or plates are disposed together and secured to each other by welding opposed shoulders as illustrated in Fig. 2, define sides 10 of the pallet and apertures 11 open therethrough. The edge portions of the upper and lower decks are partially rolled over so that apertures 11 are substantially smooth edged.

Referring now to Figs. 7 to 10, the pallet illustrated comprises rectangular upper and lower decks A and B of sheet metal, and a pair of relatively thin rods 30 disposed around the periphery of decks A and B. The deck A, like the corresponding part of the pallet of Fig. 1, is a single sheet metal part which has the plurality of bosses 33, channels 35 and diagonally extending channels 36 all of which are suitably formed by stamping or punching operations. Altogether there are nine bosses 33 disposed in three rows of three each, four being located near each of the four corners of a deck, one being disposed in the center of the deck, and the remaining four being spaced around the edges of the deck midway between the four corners thereof. Channels 35 and 36 do not communicate with each other, and do not extend to the edge portions of the plate, as illustrated in Fig. 1. The rod 30 of the upper deck is disposed around the edge of the deck and said edge is rolled over the rod in the manner illustrated in Fig. 9 so as to securely hold the rod in position. Corner portions of deck A, as well as the mid-sections of the edges between the corners are cut away or notched, thus exposing portions of the rod.

Deck B is also a sheet metal part and, like the deck B of the pallet of Fig. 1, is cut away in four quadrants or sections around the central aperture. This deck is provided with bosses 40 disposed to engage bosses of the upper deck. The lower deck is also provided with a rod over which the edge of the deck is rolled, as above described and as shown in Fig. 8. The corners and intermediate edge portions of deck B are cut away in a manner similar to deck A, and the rod is similarly exposed in those places.

The pallet of Fig. 10 comprises in addition to rods 30 and decks A and B, a plurality of cup-shaped sheet metal members 50 secured to the decks by welds. The decks are provided with a plurality of apertures arranged in the pattern of the bosses 33 of Fig. 7. Members 50 are disposed with lip portions secured to the under surface of deck A and the upper surface of deck B and thus define in effect and appearance the structure of bosses 33, and decks A and B of Fig. 7.

In making the pallets of Fig. 1 in accordance with this invention, metal sheets are cut into generally square shapes having rounded corners and punched to produce central apertures, and are stamped to produce channels 17 and half of them are cut away in four sections around the central aperture. The corners and central portions of the sides are double flanged and the intermediate portions of the sides are folded under so that no sharp edges are exposed. The sheets are assembled in pairs consisting of a plate of each type with corresponding double flange portions in contact, and are welded together along the contacting surfaces.

The pallets of Fig. 7 may be made by cutting metal sheets into generally square shapes having rounded corners, punching central apertures in the squares, and stamping the sheets to produce channels 35 and 36 in half of them and only channels 35 in the others, and cutting substantially square portions out of four sections of said other sheets around their central apertures. The corners and central portions of the sides of the sheets are cut back slightly, a rod 30 in the form of a closed square is disposed around the edges of each sheet, and the edge portion of each sheet is rolled over a rod to retain it in position. The sheets are then punched to produce bosses 33 and 40 and are assembled together in pairs consisting of one plate of each type with the bosses engaged. As the final operation, the plates are welded together along engaged surfaces.

Having thus described the present invention so that those skilled in the art may be able to understand and practice the same, I state that what I desire to secure by Letters Patent is defined in what is claimed.

What is claimed is:

A fabricated, four-way, substantially rectangular pallet for use in supporting a load to be carried by a lift truck comprising a sheet metal upper deck on which loads may be placed and carried, said upper deck having an upper substantially flat load-supporting surface portion extending to the periphery of the deck on each of the four sides thereof, a flange formed on said upper deck and extending around its outer periphery, said upper deck flange having its free edge portion turned inwardly of the pallet and disposed substantially parallel to the top of the deck and under the flat peripheral surface portion of the said deck, said upper deck flange additionally having portions of substantially increased width extending around each corner and disposed at spaced locations between corners, a sheet metal lower deck to rest on a floor, a flange formed on said lower deck and extending around its outer periphery, said lower deck flange having its free edge portion turned inwardly of the pallet in substantially parallel relation to the free edge portion of the upper deck, said lower deck flange additionally having portions of substantially increased width extending around each corner and disposed at spaced locations between corners, the free edge portions of the increased width portions of the upper and lower decks being engaged and welded together, the increased width flange portions of the upper and lower decks cooperating with intermediate flange portions to define a pair of openings in each side of the pallet in which lift truck forks may be received to lift and carry the pallet and its load.

ALVIN J. FARRAR.

REFERENCES CITED

The following references are of record in the file of this patent:

UNITED STATES PATENTS

| Number | Name | Date |
| --- | --- | --- |
| 1,161,167 | Thornton | Nov. 23, 1915 |
| 1,612,382 | Lehman | Dec. 28, 1926 |
| 1,881,144 | Stein | Oct. 4, 1932 |
| 2,369,944 | Cahners | Feb. 20, 1945 |
| 2,450,848 | Wisberger | Oct. 5, 1948 |
| 2,542,129 | Fletcher | Feb. 20, 1951 |